July 9, 1963

H. S. POLIN 3,097,337

APPARATUS AND METHOD FOR ELECTROLUMINESCENT
NON-DESTRUCTIVE FLAW DETECTION

Filed May 17, 1960

INVENTOR
Herbert S. Polin

BY *MOORE & HALL*
ATTORNEYS

United States Patent Office 3,097,337
Patented July 9, 1963

3,097,337
APPARATUS AND METHOD FOR ELECTROLUMINESCENT NON-DESTRUCTIVE FLAW DETECTION
Herbert S. Polin, Veyrier (Geneva), Switzerland
(2 East End Ave., New York 21, N.Y.)
Filed May 17, 1960, Ser. No. 29,695
10 Claims. (Cl. 324—32)

The invention concerns non-destructive detection of flaws in materials by the use of electroluminescent compositions.

It is an object of the invention to use an electroluminescent powder or electroluminescent penetrant to determine the existence of surface imperfections of small dimension.

It is an object of the invention to provide a method for indicating the location of a flaw having a surface component in a material.

There exists a variety of penetrant compositions which may carry a substance having a distinctive color which concentrates in a surface imperfection in a material under test, and which may be a dye or a fluorescent powder. For example, the metallic sulphides show a characteristic glow under activation by ultra-violet light. This class of compound and the means for making its members visible, particularly when the imperfection to be detected is of very small dimension, has certain limitations and disadvantages. First, the brilliance of the compound's fluorescence under activation is not particularly high when the concentration of the compound, in a small crack for example, is quite low. Second, there is a tendency for the compound to grow progressively weaker in its fluorescence intensity, with time of exposure, making location of flaws more difficult.

In the system to be described, activation of the phosphor is accomplished by the application of an electrical field and imperfections with limits in the micro scale may be readily detected. The glow of the phosphor is intense and stable with time.

The system proposes the use of the phenomena of electroluminescence, and it has been found that a surface discontinuity having a component of depth sufficient to form an electrocapacitative micro-module, may be caused to become an electroluminescent element under certain conditions.

The term electro-luminescence is applied to a variety of phenomena which occur when a phosphor is subjected to an electrical field. One form of activation may be by application of a direct-current field to the phosphor which may be zinc-sulphide, for example, or any metallic sulphide or salt of a metal reacting to form a phosphor. Under direct-current activation, at a voltage in excess of 100 volts, depending upon the concentration of the phosphor and other limiting conditions, a single luminescent flash of high intensity will occur; another flash of luminescence will occur when the power circuit is opened. For obtaining this phenomenon under the conditions of a flaw detection procedure, it is necessary that the phosphor make effective electrical contact with electrode surfaces. In practice, the phosphor, carried in a volatile vehicle such as alcohol, benzene, hydrocarbons, etc. to serve as a penetrant, is flowed over the surface to be inspected. After the carrier has evaporated and the surface cleaned of superficial phosphor, the electrical field is applied between two electrodes, one acting as a surface probe to search out points or areas of illumination. Fluorescence flashes will appear in easily detected brightness at such points where an imperfection has a measure of depth sufficient to hold a concentration of phosphor, acting as two electrodes of a system bridged by the phosphor. If the direct-current source is pulsed at a selected frequency, a flash of repetitive character will occur with each make and break of the circuit.

A preferred embodiment of the invention is with the use of an alternating electrical field of higher voltages. In this embodiment, light emission is continuous and the phosphor is activated by a true field effect. In practice, the phosphor, which may be any luminescent powder such as copper activated zinc sulfoselenide, for example, is made up into a stable suspension in a penetrant carrier such as hydrocarbon, alcohol, benzene, etc., having no appreciable direct-current conductivity. Alternatively, the phosphor may have been previously treated with a microfilm of dielectric such as polystyrene, Lucite, polyvinylchloride, etc., and comminuted to micron size and used with any penetrant as a carrier. Thus, the phosphor and carrier, flowed onto a surface to be inspected, will concentrate in a flaw sector. Two electrodes from the alternating current source, one of which acts as a search probe, survey the test surface and where a flaw exists the dimensions of depth of which are sufficient to act as a capacitor in the electrical circuit bridged by the dielectric isolated phosphor, the phosphor will glow brightly under the stress of the applied field. An electroluminescent cell is formed by the pseudo parallel plate capacitor derived from the conformation of the crack, and the phosphor electrically isolated from the pseudo-capacitor plates, with power supplied by the localized field imposed by the search electrodes and the alternating current source. The power source may be of any convenient frequency having an output voltage which may range from 100 volts to many thousands of volts, depending upon the relative location of the electrodes and the size of field that they subtend, and the size of the flaw and its electrical constants as a pseudo-capacitor. The brightness of the luminescence increases with voltage but a general lower limit of 3000 volts per square centimeter is considered necessary for non-facilitated electro-luminescence.

The invention may be best understood by reference to the appended drawing wherein like numbers refer to like parts throughout.

Figure 1:
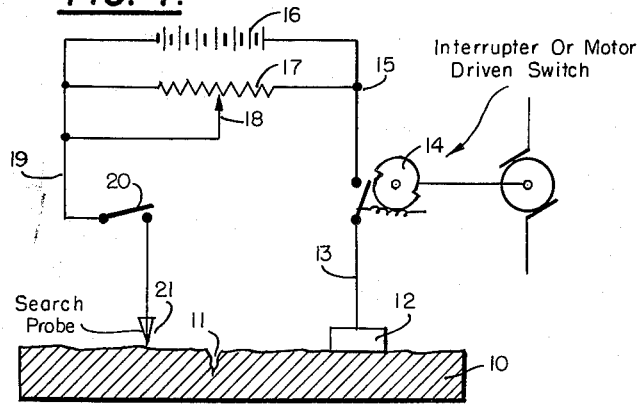
FIGURE 1 is a schematic diagram according to the invention of one form of direct-current circuit for activation by flashing the phosphor which is in direct electrical contact with the walls of the flaw acting as contact electrodes.
Figure 2:
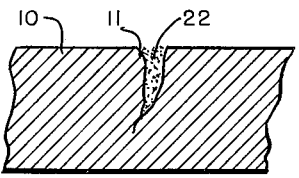
FIGURE 2 is an enlarged view of a flaw in section showing phosphor in position.

In the schematic circuit shown in FIGURE 1 a piece of material under test 10, which may be a metal casting, forging, finished machined part or the like, may contain a flaw such as 11 which should be detected to prevent failure of a device of which the piece is to become a part. A fixed electrode 12, which may be placed on or fastened to and in good electrical contact with piece 10, is connected by wire 13 to a circuit interrupter or motor driven switch 14 for providing pulsating direct current. Circuit interrupter 14 is connected at junction 15 to one side of battery 16 across which is connected a rheostat and ballast comprising variable resistance 17 with a movable slide contact 18. Slide contact 18 is connected by wire 19 containing switch 20 to search probe 21.

Figure 3:
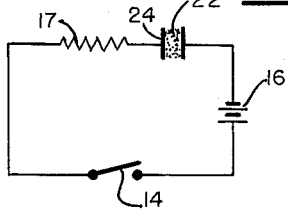
FIGURE 3 is a schematic view of an equivalent electrical circuit with the phosphor in position supplied as an aid in explaining the operation of FIGURE 1.
Figure 4:
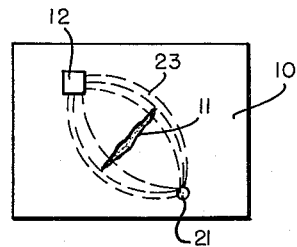
FIGURE 4 is a plan view of a flaw in material under test according to the invention, showing the pattern of the field in both A.C. and D.C. systems when the fixed and search electrodes are juxtaposed about a fault.

The electroluminescent powder or phosphor is indicated at 22 in flaw 11 into which it is carried by the penetrant or merely dusted into place. The use of a vehicle or penetrant to carry the material will in many cases disclose smaller flaws than dusting alone can do. The fixed electrode 12 is placed in good contact with the test piece 10 and the search electrode or probe 21 is moved over the area under inspection, preferably in good electrical contact with the surface under test. Switch 20 is closed and slide 18 adjusted along resistance 17 to provide a sufficiently high potential to produce electroluminescence. As shown by FIGURE 4, a field 23 is set up between electrode 12 and probe 21. If a flaw 11 is within the ambit of this field 23, so that the field strength is sufficient to cause material 22 to luminece, the walls of flaw 11, with the fluorescent particles 22 in between and in effective electrical relation, may be regarded as pseudo condenser plates in an A.C. system, or as electrodes in a D.C. system of energization of the equivalent electrical circuit of FIGURE 3. As interrupter 14 makes and breaks the circuit the field 23 is built up and broken down and with each make and break the particles 22 are energized and produce a flash or glow.

Figure 5:
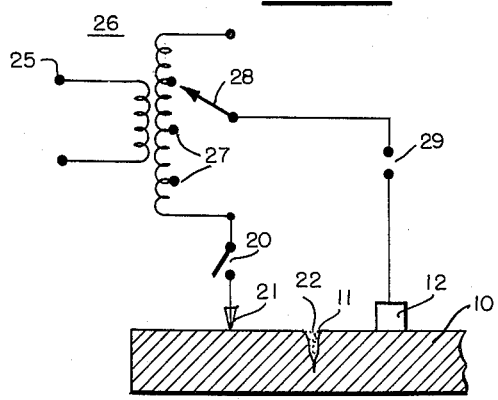
FIGURE 5 is a schematic view of an alternating-current system in which the phosphor is ohmically isolated from the circuit but forms a part of the A.C. field at the pseudo-capacitor formed by the fault.

In FIGURE 5, alternating current is used to give a continuous glow of particles 22 at the flaw 11. It may be noted that in an A.C. system, the fluorescent substance is coated with a dielectric coating or is in a non-conductive penetrant carrier. An A.C. source 25 may be an ordinary power main or a high frequency oscillator. Where 110 volt A.C. is used, a step-up transformer 26 may be connected in the circuit with a plurality of taps 27 in the secondary for the application of a selected voltage to the circuit. A voltage selector switch 28 is connected to electrode 12 through ballast or gap 29 to limit current flow or prevent a short circuit. Probe 21 and switch 20 are connected to one end of the secondary of transformer 26.

Figure 6:
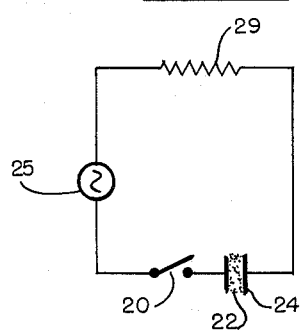
FIGURE 6 is a schematic showing of an equivalent A.C. circuit with the phosphor within the field of the pseudo-capacitor.

The equivalent circuit is shown in FIGURE 6, where pseudo-electrodes 24 again represent the condenser effect of the walls of the flaw 11 with phosphor particles 22 therebetween.

It will be seen that a 60-cycle electric field will be established between probe 21 and fixed electrode 12. If flaw 11 is within the effective range of the field the walls of the flaw provide a condenser or pseudo-electrode effect and activate the particles 22 therebetween to give a continuous glow, the brightness of which can be controlled by a voltage selector switch 28. In this construction the particles 22 need not be in contact with the walls of flaw 11 to be activated and glow.

A piece under test is inspected systematically to assure that no area is missed. For larger surfaces and special shapes fixed electrode 12 is placed sequentially in selected spots on the test piece and exploring probe 21 is moved to scan a corresponding local area over which the field 24 is effective to produce a sufficient level of luminescence.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. In a device for the non-destructive testing for flaws in material to which an electro-luminescent phosphor has been applied in finely divided form capable of penetrating hair line cracks and other flaws in the surface of the material, a fixed electrode constructed to be applied to a piece of material under test at selected points, a movable probe, circuit means connecting said electrode and said movable probe to supply a pulsating voltage thereto to create an electric field between said electrode and said probe and in and around said material, said field being of sufficient value to activate phosphor particles within said field and to cause them to luminesce and reveal a flaw in material under test.

2. In a device for the non-destructive testing for flaws in material to which an electro-luminescent phosphor has been applied, a fixed electrode constructed to be applied to a piece of material under test at selected points, a movable probe, circuit means connecting said electrode and said movable probe to supply a pulsating voltage thereto to create an electric field between said electrode and said probe and in and around said material, said field being of sufficient value to activate phosphor particles within said field and to cause them to luminesce and reveal a flaw in material under test, said circuit means comprising a high frequency oscillator and means to vary the voltage supplied by said circuit and thereby the value of said field.

3. In a device for the non-destructive testing for flaws in material to which an electro-luminescent phosphor has been applied, a fixed electrode constructed to be applied to a piece of material under test at selected points, a movable probe, circuit means connecting said electrode and said movable probe to supply a pulsating voltage thereto to create an electric field between said electrode and said probe and in and around said material, said field being of sufficient value to activate phosphor particles within said field and to cause them to luminesce and reveal a flaw in material under test, said circuit means comprising a direct current supply, interrupter means and a rheostat for pulsing said pulsating voltage at a selected frequency and level to produce a selected value of said field.

4. A process for non-destructive flaw detection in a material sufficiently conductive to permit current flow therethrough comprising the steps of applying finely divided electro-luminescent material to a surface of the material to be tested so that individual grains of the electro-luminescent material are deposited in any fine hair-line flaw and imperfections which may be present in said surface and that grains of electro-luminescent material so deposited are held by walls and edges of any such flaw or imperfections and subjecting said material to be tested to a pulsating electric field capable of activating any electro-luminescent material held by the surface to produce a signal indicating the presence of a flaw.

5. A process for non-destructive surface flaw detection as set forth in claim 4, said step of subjecting said material to a pulsating electric field acting to produce a condenser effect across the sides of a surface flaw and thereby to activate any electro-luminescent material between the sides of said flaw and at the edges of said flaw.

6. The process of claim 5 in which said material is dusted on said surface.

7. The process of claim 5 in which said material is applied as a suspension in a volatile penetrant vehicle and said vehicle is evaporated.

8. The process of claim 5 in which said material is applied to the surface with a volatile penetrant of liquids and said surface is wiped clean of excess material before any material remaining is activated to reveal the presence of flaws.

9. In a system for the non-destructive detection of flaws in metal bodies having a surface to be tested, an electrode to be positioned on said surface, a movable probe for exploring a selected area of said surface to detect the presence of isolated fine particles and hair-line groupings of fine particles of luminescent material deposited in situ by a volatile carrier liquid and held by a surface flaw which may be present in said surface and circuit means connected to said electrode and said probe to produce a field therebetween to activate any luminescent material held by a flaw in said surface, said circuit means comprising a source of pulsating voltage.

10. In a system for the non-destructive detection of flaws in metal bodies having a surface to be tested, an electrode to be positioned on said surface, a movable probe for exploring a selected area of said surface to detect the presence of isolated fine particles and hair line groupings of fine particles of luminescent material held by a surface flaw which may be present in said surface and circuit means connected to said electrode and said probe to produce a field therebetween to activate any luminescent material held by a flaw in said surface, said circuit means comprising a source of pulsating voltage, said source of pulsating voltage comprising a high frequency oscillator, said circuit means comprising means to vary the voltage supplied by said circuit means to said probe and to said electrode to adjust the value of said field and the resultant response of any luminescent material held by a flaw in said surface.

References Cited in the file of this patent
UNITED STATES PATENTS

| | | |
|---|---|---|
| 2,259,400 | Switzer | Oct. 14, 1941 |
| 2,809,316 | Jeges | Oct. 8, 1957 |
| 2,881,344 | Michlin | Apr. 7, 1959 |